J. McKEE.
Apparatus for Preparing Food for Animals.

No. 202,360. Patented April 16, 1878.

Witnesses
S. N. Piper
L. W. Miller

Inventor
John McKee
by his attorney
R. H. Eddy

UNITED STATES PATENT OFFICE.

JOHN McKEE, OF LAWRENCE, MASSACHUSETTS, ASSIGNOR TO HIMSELF, HENRY M. BICKFORD, AND NELSON H. BERRY, OF SAME PLACE.

IMPROVEMENT IN APPARATUS FOR PREPARING FOOD FOR ANIMALS.

Specification forming part of Letters Patent No. 202,360, dated April 16, 1878; application filed January 26, 1878.

*To all whom it may concern:*

Be it known that I, JOHN McKEE, of Lawrence, of the county of Essex and State of Massachusetts, have invented a new and useful Apparatus or Mechanism for Cooking and Grinding Grain or Vegetable Matters for Improving them as Animal Food; and do hereby declare the same to be described in the following specification and represented in the accompanying drawings, of which—

Figure 1:
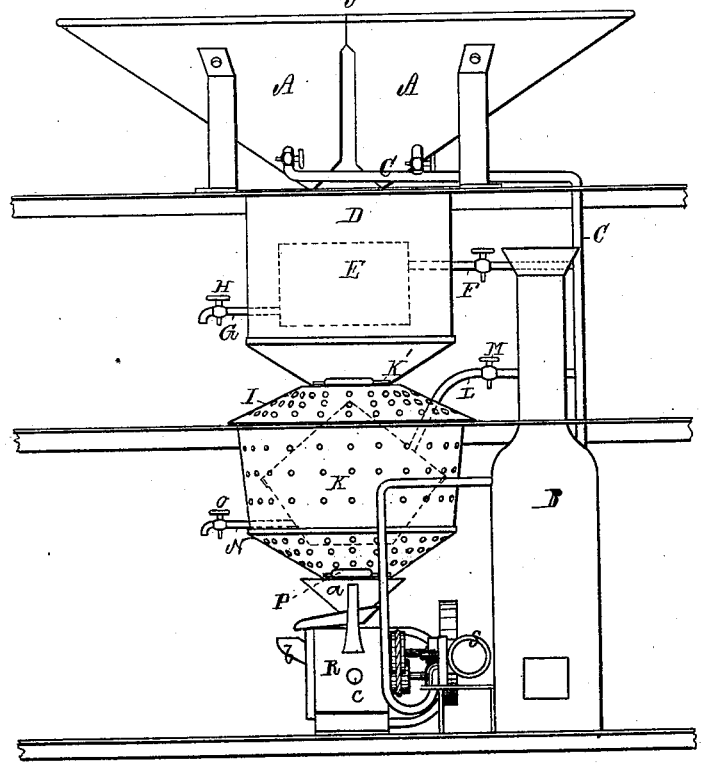
Figure 2:
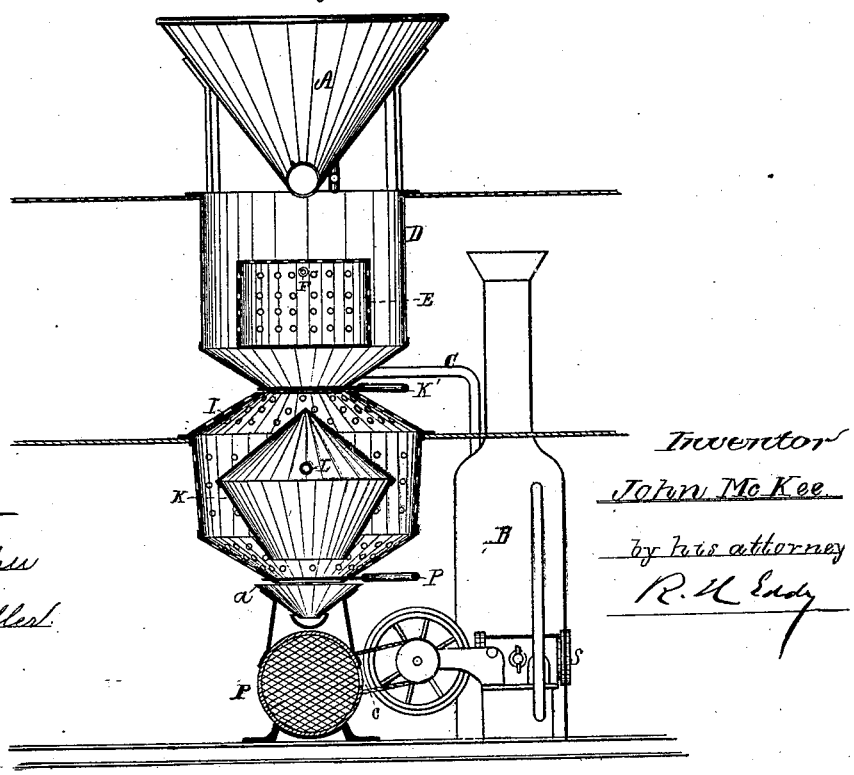

Figure 1 is a front elevation, and Fig. 2 a vertical section of it.

This invention is to steam or cook, dry, and grind the grain or vegetable matter or prepare it for use as food for horses or other animals.

In the drawings, A A denote two hoppers, connected with a steam-generator, B, by a pipe, C, or branches therefrom, which should be provided with suitable stop-cocks for regulating the supply of steam to such hoppers.

Each hopper may have a valve or damper at its lower end.

Directly beneath the said hoppers is a tank, D, having within it a vessel, E, whose sides are foraminous, or perforated with holes, for discharge of steam into the said tank. The vessel E communicates with the steam-pipe C by a branch pipe, F, which should be provided with a stop-cock.

From the lower part of the steam-distributer E a waste-water pipe, G, furnished with a stop-cock, H, leads, as shown.

The tank D, at bottom, opens into a perforated drying-kiln, I, within which is a heat-radiator, K, the opening in the bottom of the tank being provided with a gate, K'.

The radiator communicates with the steam-pipe C by a branch pipe, L, provided with a stop-cock, M. At its bottom the radiator has a branch water-pipe, N, furnished with a stop-cock, O.

Furthermore, the kiln at bottom is open, and there has a gate, P, the opening being directly over the hopper $a$ of a grinding-mill, B, whose rotary grinder is revolved by means of a steam-engine, S, of any ordinary and suitable construction, connected with it and to the boiler B.

The induct of the mill is shown at $b$, and its educt at $c$.

One hopper only need be used; but when two different kinds of grain or vegetable matters are required to be mixed, cooked, dried, and ground together, two hoppers will be found to be advantageous.

The object of having the hoppers connected with the steam-generator in manner as represented is to admit of the grain being steamed and swelled before being cooked in the tank below, as the steaming and swelling not only prepare it for being cooked to advantage, but relieve it of gases detrimental to it as an article of food.

The grain from the hoppers passes into the tank beneath, which, being duly supplied with water, if necessary, may have steam discharged into the water or charge of grain. Such charge, after having been properly cooked, is to be caused to pass into the desiccator. After having been thoroughly or sufficiently deprived of moisture thereby, the grain is to be discharged from the desiccator into the grinding-mill, and by it be reduced or ground, as may be required for use.

I hereby disclaim the apparatus described in the United States Patent No. 126,511, granted May 7, 1872, to Henry H. Beach, for process and apparatus for curing corn and other grains.

I claim as my invention—

The combination, with the grinding-mill R, steam-engine S, and boiler B, of one or more hoppers, A, the steaming-tank D and its steam-distributer E, the kiln I, and its radiator K, adapted to operate substantially as described, and for the purpose set forth.

JOHN McKEE.

Witnesses:
S. M. DAVIS,
CHAS. SLATER.